No. 825,102. PATENTED JULY 3, 1906.
C. A. BARBER, M. J. CARR & R. H. MITCHELL.
SHAFT DETACHER.
APPLICATION FILED NOV. 8, 1905.
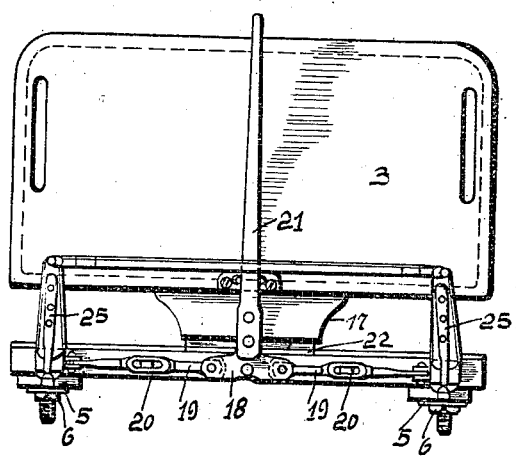
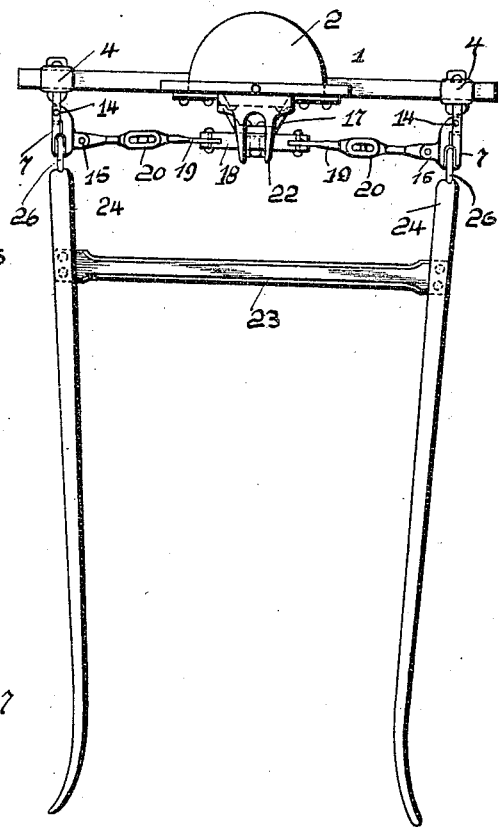
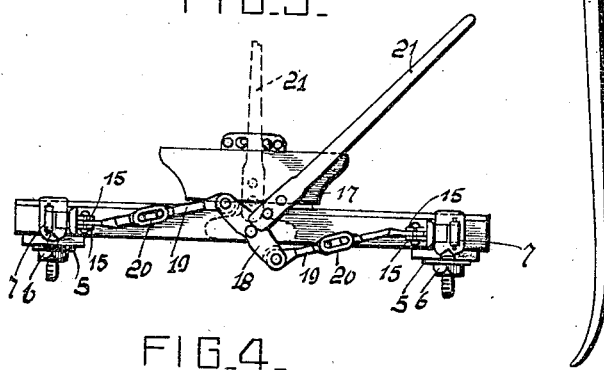
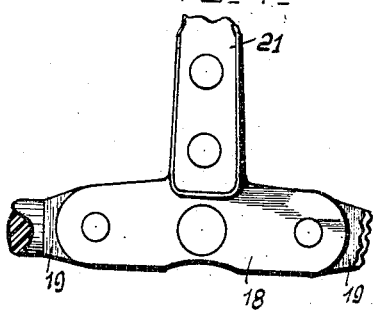
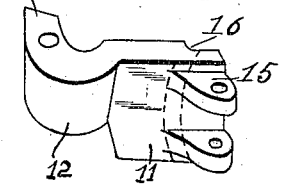
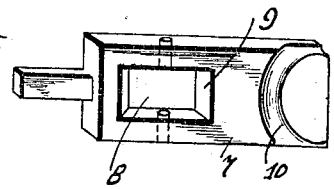

UNITED STATES PATENT OFFICE.

CHARLES A. BARBER AND MERVIN J. CARR, OF NEW BRIGHTON, AND ROBERT H. MITCHELL, OF BEAVER FALLS, PENNSYLVANIA.

SHAFT-DETACHER.

No. 825,102.  Specification of Letters Patent.  Patented July 3, 1906.

Application filed November 3, 1905. Serial No. 286,437.

*To all whom it may concern:*

Be it known that we, CHARLES A. BARBER and MERVIN J. CARR, residing at New Brighton, and ROBERT H. MITCHELL, residing at Beaver Falls, in the county of Beaver, State of Pennsylvania, citizens of the United States of America, have invented certain new and useful Improvements in Shaft-Detachers, of which the following is a specification, reference being had therein to the accompanying drawings.

This invention relates to certain new and useful improvements in shaft-detachers; and the primary object of the invention is to provide novel means for detachably holding a pair of shafts to a buggy or the like vehicle.

Our invention aims to provide positive and reliable means for detachably connecting a pair of shafts to a buggy or the like vehicle, whereby the shafts can be instantly detached therefrom at any desired time. In this connection the invention is used when a horse attached to a vehicle becomes unmanageable and cannot be controlled, and to insure the safety of the vehicle and its contents it is necessary to detach the animal from said vehicle. To this end we have devised novel means for temporarily holding a pair of shafts in connection with a vehicle and have provided means that can be conveniently actuated to release the shafts.

With the above and other objects in view the invention consists in the novel construction, combination, and arrangement of parts to be hereinafter more fully described and then claimed.

Referring to the drawings accompanying this application, like numerals of reference designate corresponding parts throughout the several views, in which—

Figure 1 is a front elevation of our improved shaft-detacher. Fig. 2 is a plan, the dashboard thereof being broken away. Fig. 3 is a front elevation of the detacher in an open position. Fig. 4 is a fragmentary front elevation of a T-shaped lever used in connection with the detacher. Fig. 5 is a perspective view of a movable jaw. Fig. 6 is a similar view of a retaining-block.

In the accompanying drawings, 1 designates the front axle of a vehicle, 2 the fifth-wheel thereof, and 3 the dashboard of the body of the vehicle.

Our invention resides in providing the axle with straps 4 4, which are secured to said axle by the plates 5 5 and nuts 6 6, said straps being substantially U-shaped and of a conventional form generally employed for embracing the front axle of a vehicle. The front edges of the straps 4 4 are provided with outwardly-extending retaining-blocks 7 7, said blocks having their rear ends provided with slots 8 8, having beveled faces 9 9. The forward ends of the blocks have their confronting faces provided with segment-shaped grooves 10 10, the object of which will be presently described.

In each one of the slots 8 of the retaining-block 7 is pivotally mounted a movable jaw 11, said jaw having a contracted pierced end 12, adapted to fit within the slots 8, to be secured therein by pins 14 14. The contracted end 12 of each jaw is beveled, as at 13, to engage the beveled face 9 of the slot 8 and limit the outward movement of the jaw relative to its respective retaining-block. The forward end of each jaw has its rear face provided with two pierced lugs 15 15, while the face of the jaw confronting the retaining-block 7 is provided with a segment-shaped groove 16, corresponding to the groove 10 of the retaining-block in connection with which it operates.

Centrally of the axle we mount a bracket 17, and pivotally connected to said bracket is an inverted-T-shaped arm or lever 18, the ends of the horizontal portion of said lever being connected by links 19 19 to the pierced lugs 15 of the movable jaws 11 11. Each one of the links is provided with a turnbuckle 20 of a conventional form. The vertical portion of the arm 18 is provided with an upwardly-extending lever 21, adapted to extend a slight distance above the dashboard 3 of the vehicle, whereby it may be conveniently reached and manipulated.

The lower edge of the dashboard is provided with an outwardly-extending clip 22, and said clip is adapted to engage the lever 21 and retain it in a vertical position relative to the axle 1 of the vehicle.

The pair of shafts 23, which we employ in connection with the vehicle, have their curved ends 24 24 provided with metallic cleats 25 25, having ring-shaped ends 26 26, by which the pair of shafts is connected to the vehicle.

When the lever 21 is in an oblique position, such as illustrated in Fig. 3 of the drawings, the movable jaws 11 11 of the detacher are swung outwardly from the retaining-blocks 7 ready to receive the rings 26 26 of the shafts 23. When the rings are positioned between the retaining-blocks and the movable jaws, they can be clamped therein by throwing the lever 21 in a vertical position to be engaged by the clip 22. When in said position, the rings are firmly held in the grooves 10 and 16 of the retaining-blocks and movable jaws, respectively, said grooves forming a curved recess for a portion of each ring, and when the lever 21 is in a vertical position it will be impossible for the rings to become detached from the vehicle. Should the driver of the vehicle lose control of the animal hitched to said vehicle, the lever 21 is manipulated to move the jaws 11 of the detacher, permitting the shafts to drop and allowing the animal or horse to proceed without the vehicle.

We desire to call attention to the fact that when the rings 26 are held between the retaining-blocks 7 and the movable jaws that when the vehicle is being moved by an animal hitched to the same the pulling power is equalized between the retaining-blocks and the movable jaws, the grooves cut in the retaining-blocks receiving as much pressure as the grooves in the movable jaws.

In practice the animal hitched to a vehicle constructed in accordance with our invention may be provided with a strap similar to a "kicking-strap" to support the rear end of the shafts when they are detached, thereby preventing the animal from being injured by the shafts dragging upon the ground and entangling the horse's feet or tripping him.

By employing the turnbuckle 20 in connection with the links 19 we can easily and quickly adjust the position of the movable jaws 11 relative to the retaining-blocks.

We do not care to confine ourselves to the particular form of clip illustrated for retaining the lever 21 in a vertical position, and such changes in the construction and operation of our improved detacher as are permissible by the appended claims may be resorted to without departing from the spirit and scope of the invention.

What we claim, and desire to secure by Letters Patent, is—

1. In a vehicle, the combination with the front axle, of straps attached to said axle, retaining-blocks carried by said straps, said retaining-blocks having slots formed therein, jaws pivotally mounted in said slots, the confronting faces of said jaws and said blocks having segment-shaped grooves formed therein adapted to receive rings carried by the ends of a pair of shafts, a lever pivotally connected to said axle and to said movable jaws, means to adjust the movement of said jaws, and means to normally retain said lever in a vertical position, substantially as described.

2. In a vehicle, the combination with the axle thereof, of retaining-blocks detachably connected to said axle, jaws pivotally mounted in said blocks, the confronting faces of said jaws and said blocks having grooves formed therein adapted to engage the ends of a pair of shafts, a lever pivotally connected to said axle so as to swing in a plane parallel with the axle, links pivotally connected to said lever and pivotally connected to said jaws, means to adjust said link, and means to normally hold said lever in a vertical position, substantially as described.

3. In a vehicle, the combination with an axle, of retaining-blocks carried by said axle, jaws pivotally connected to said blocks and adapted to hold the ends of a shaft in engagement with said blocks, a lever pivotally connected to said axle, said lever swinging in a plane parallel to the axle, links pivotally connected to said lever and to said jaws, means to normally hold said lever in a vertical position, substantially as described.

In testimony whereof we affix our signatures in the presence of two witnesses.

CHARLES A. BARBER.
   MERVIN J. CARR.
   ROBERT H. MITCHELL.

Witnesses:
 FRANK DAVIS,
 WILLIAM BLAIR.